US006832732B2

(12) United States Patent
Burkett et al.

(10) Patent No.: US 6,832,732 B2
(45) Date of Patent: Dec. 21, 2004

(54) HOLDING CABINET WITH CLOSED-LOOP HUMIDITY CONTROL SYSTEM AND METHOD FOR CONTROLLING HUMIDITY IN A HOLDING CABINET

(75) Inventors: Douglas A. Burkett, Eaton, OH (US); James W. Meeks, Arcanum, OH (US); Gary L. Mercer, Eaton, OH (US); Craig J. Vagedes, Dayton, OH (US)

(73) Assignee: Henny Penny Corporation, Eaton, OH (US)

( * ) Notice: Subject to any disclaimer, the term of this patent is extended or adjusted under 35 U.S.C. 154(b) by 0 days.

(21) Appl. No.: 10/252,842

(22) Filed: Sep. 24, 2002

(65) Prior Publication Data

US 2003/0116636 A1 Jun. 26, 2003

Related U.S. Application Data

(62) Division of application No. 09/671,700, filed on Sep. 28, 2000, now Pat. No. 6,454,176.
(60) Provisional application No. 60/156,449, filed on Sep. 28, 1999, and provisional application No. 60/217,707, filed on Jul. 12, 2000.

(51) Int. Cl.[7] ............................................. G05D 21/00
(52) U.S. Cl. ................................... 236/44 C; 219/401
(58) Field of Search .......................... 99/468; 219/401; 392/401; 236/44 C

(56) References Cited

U.S. PATENT DOCUMENTS

| 3,821,947 | A | * | 7/1974 | Schossow | .................. 128/1 B |
|---|---|---|---|---|---|
| 4,426,923 | A | | 1/1984 | Ohata | .......................... 99/468 |
| 4,953,784 | A | | 9/1990 | Yasufuku et al. | ......... 236/44 A |
| 5,025,132 | A | | 6/1991 | Fortmann et al. | ........... 219/401 |
| 5,507,433 | A | | 4/1996 | Jardinier | ................... 236/91 C |
| 5,532,456 | A | | 7/1996 | Smith et al. | ................ 219/400 |
| 6,454,176 | B1 | | 9/2002 | Burkett et al. | ............ 236/44 A |

FOREIGN PATENT DOCUMENTS

EP 0612494 8/1994

OTHER PUBLICATIONS

McGraw–Hill, 1957 Considine, Process Controls Handbook, P 11–17 & P 11–18.*

* cited by examiner

*Primary Examiner*—Harry B. Tanner
(74) *Attorney, Agent, or Firm*—Baker Botts L.L.P.

(57) ABSTRACT

A holding cabinet with closed-loop humidity control system and method for controlling humidity in a holding cabinet are disclosed. According to an embodiment, the method comprises determining a relative humidity set point; activating a heater in a fluid pan; determining if a fluid is present in the fluid pan; measuring the relative humidity in the cabinet; and maintaining the relative humidity within a predetermined range. According to another embodiment, a holding cabinet with a closed-loop humidity control system includes a holding cabinet; an air temperature probe for measuring an air temperature within the holding cabinet; a humidity sensor for measuring a humidity within the holding cabinet; a heater for heating air within the holding cabinet to a predetermined temperature; an air fan for circulating the air and for introducing air from outside the holding cabinet; and a water pan for holding water within the holding cabinet.

15 Claims, 17 Drawing Sheets

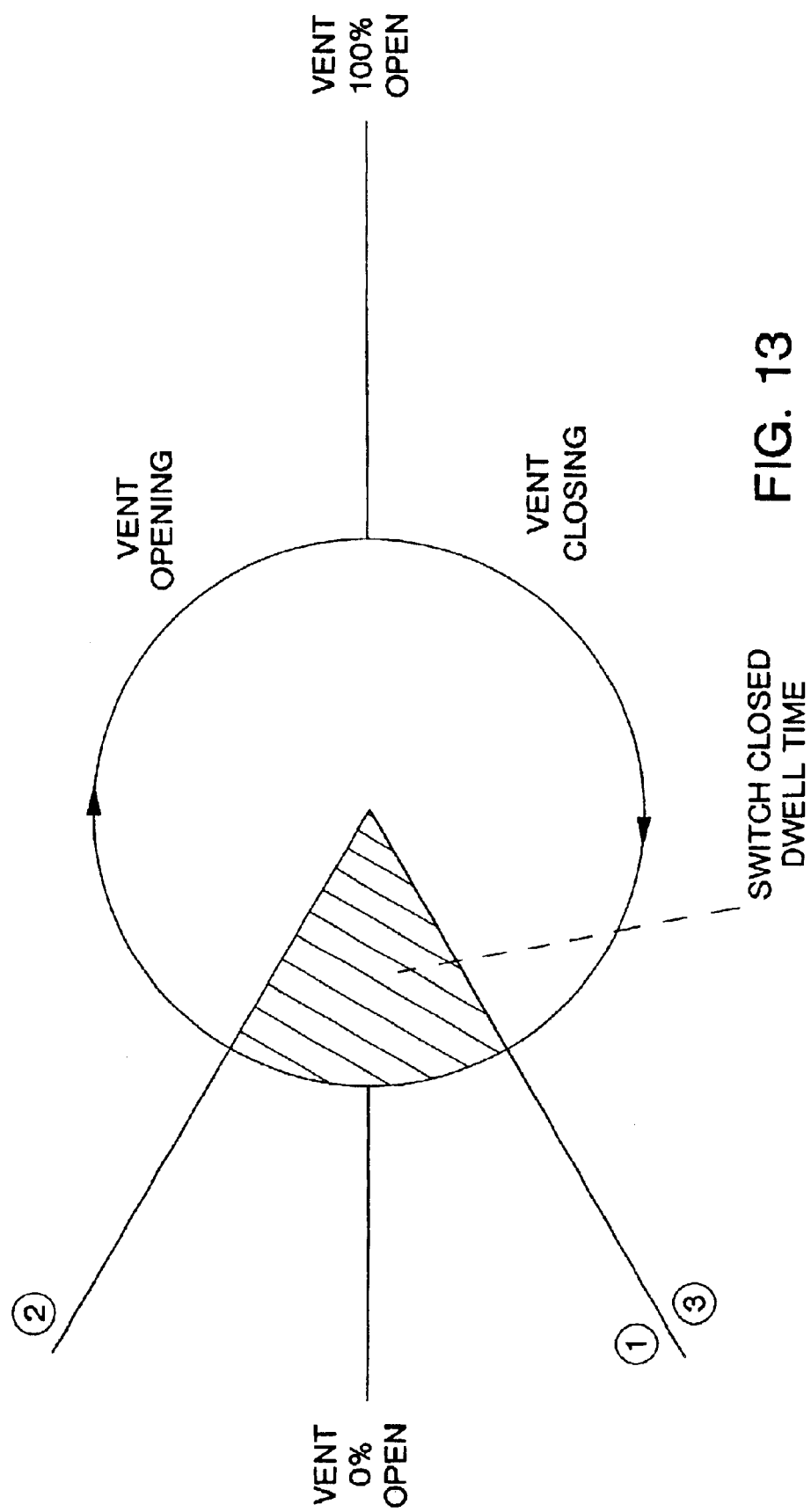

Humidity regulation variables:
D.C.= Water heat on-time duty cycle
dRH/dT= Humidity Rate-of-rise
t(on)= Water heat on-time

HOLDING CABINET WITH CLOSED-LOOP HUMIDITY CONTROL SYSTEM AND METHOD FOR CONTROLLING HUMIDITY IN A HOLDING CABINET

The present application claims priority from U.S. Provisional Patent Application No. 60/217,707, entitled "Holding Cabinet with Closed-Loop Humidity Control System and Method for Controlling Humidity in a Holding Cabinet," filed Jul. 12, 2000, and U.S. Provisional Patent Application No. 60/156,449, entitled "Holding Cabinet with Closed-Loop Humidity Control System and Method for Controlling Humidity in a Holding Cabinet," filed Sep. 28, 1999, which are incorporated herein by reference.

BACKGROUND OF THE INVENTION

1. Field of the Invention

The present invention relates to a holding cabinet, which provides a more consistent and accurate holding environment for food products. In particular, the invention relates to a holding cabinet, which provides a more consistent and accurate holding environment for food products by providing closed-loop control of the humidity within the cabinet as a controlled process variable.

2. Description of Related Art

With the increasing popularity of "fast food" establishments where food is precooked for later sale, there is a demand for food holding devices that maintain food at a substantially uniform temperature for selected periods of time while preserving the taste, moisture content, texture and quality of the food. Further, in other applications, it is desirable to be able to restore food, particularly baked goods, to acceptable quality after long storage periods.

In many instances, storage of "fast foods" is particularly difficult because beat loss, bacteria growth and moisture loss experience by the food at storage conditions provided by prior art devices, particularly where the food is to be stored warm, contribute to rapid deterioration of the food.

More particularly, it has been found that air circulation characteristics and improper storage temperature contribute significantly to bacteria growth and excessive loss of moisture which leads to food shrinkage, so that in improper storage atmosphere the food deteriorates after only a short period of time and loses its tenderness, appetizing taste, and appearance.

It has also been found that even where food is stored under favorable conditions in an enclosure, the food deteriorates at a rate dependent on the time the door to the enclosure is opened so the storage chamber is exposed to the ambient atmosphere.

Additionally, it is known that in storage of some foods, such as fried chicken or fish, where a crust is provided, it is particularly desirable to maintain the crispness of the crust while minimizing the moisture loss from the underlying meat. Storage of such foods tends to involve the satisfaction of seemingly mutually exclusive conditions, to hold the crispness of the crust by maintaining low moisture content in the crust while minimizing moisture loss from the food. In such foods, excessive moisture-loss results in shrinkage and loss of tenderness and adversely affects the texture of the meat. This may be prevented by controlling the temperature and humidity of the storage atmosphere. The problem is to prevent moisture flow from the underlying food to the crust while holding the crust in low moisture content.

There are presently numerous cabinets for holding food products or other items in a temperature and humidity-controlled state. These cabinets, however, suffer from a common shortcoming. When the cabinets are opened to insert additional food products or other items or to remove such products or items from the cabinets, heat and humidity are lost. Unless the lost heat and humidity is restored, the items stored in the cabinets may cool or dry out, or both.

Proofing and holding are distinct food preparation processes. Proofing is a process generally applied to yeast bread products, in which the yeast grows and the bread rises due to yeast growth by products. Holding, however, is a process during which food characteristics are maintained, e.g., the temperature, moisture content, texture, and color of the food remain unchanged. Thus, in proofing, food product characteristics change, while in holding, those characteristics remain the same.

In terms of process parameters, proofing may be distinguished from holding mainly by lower process temperatures. Humidity may be greater than about 80% RH, but the selected humidity may vary widely depending on the particular bread product to be proofed. Nevertheless, proofing temperatures are generally lower than holding temperatures. High proofing temperatures might inhibit yeast growth. However, high holding temperatures are desirable because such temperatures may suppress the growth of bacteria, molds, and the like and may increase the holding time for food products.

Previously, various methods and devices have been developed to attempt to maintain heat and humidity. For example, pans of water have been placed in the cabinets and allowed to evaporate naturally in an attempt to maintain humidity. Despite its simplicity, this method has not been completely successful. Natural evaporation does not quickly compensate for humidity losses. Further, while humidity naturally increases, items stored in the cabinets are subject to the drying effect of heat. Moreover, because natural evaporation is effected by the temperature within the cabinet, the rate of humidity adjustment may fluctuate with temperature changes, but humidity adjustments will probably lag behind such temperature changes.

Systems have been developed by which the heat and humidity levels of air within a cabinet are more closely controlled. Air may be heated by passing it over, across, or through various types of heating elements. Air may also be passed over, across, or through water in order to raise the humidity of the air. Despite these improvements, known systems remain unable to precisely adjust for losses of heat or humidity due to disruptions to the cabinet environment, such as opening and closing the cabinet access, and adding or removing food products or other items.

Further, the addition of heating elements and humidity generating means create additional problems. If heat or humidity rise too quickly, the air within the cabinets could become overheated or too moist. Such uncontrolled fluctuations in heat and humidity may be detrimental to food product or other items stored within the cabinets.

Cabinets commonly are equipped with thermostats in an attempt to control the heat of the air circulating within the cabinets. By controlling the air temperature, however, the humidity of the air also may be affected. Nevertheless, such controls alone do not provide adequate control of the humidity within the cabinet. Moreover, a thermostat or manual potentiometer may not maintain temperature and humidity within predetermined parameters. Generally, such devices only cause the heating elements to heat the air when the air temperature falls below a set value.

SUMMARY OF THE INVENTION

A need has arisen for a holding cabinets for attaining closed-loop humidity control by means of an effective humidity transducer. Still a further need has arisen for a cabinet that may be used for both proofing and holding. It is a feature of such a cabinet that its control system defaults to a generally higher temperature associated with a holding mode of operation. It is an advantage of this default setting that the cabinet may inhibit the growth of bacteria in food products.

A holding cabinet with closed loop humidity control system and method for controlling humidity in a holding cabinet are disclosed. According to an embodiment, the method comprises determining a relative humidity set point; activating a heater in a fluid pan; determining if a fluid is present in the fluid pan; measuring the relative humidity in the cabinet; and maintaining the relative humidity within a predetermined range.

According to another embodiment, a holding cabinet with a closed loop humidity control system includes a holding cabinet; an air temperature probe for measuring an air temperature within the holding cabinet; a humidity sensor for measuring a humidity within the holding cabinet; a heater for heating air within the holding cabinet to a predetermined temperature; a fan for circulating the air and for introducing air from outside the holding cabinet; a slide vent and motor; and a water pan for holding water within the holding cabinet.

According to another embodiment of the present invention, a system for humidity measurement includes a humidity sensor; an oscillator circuit; and a microprocessor to measure oscillator frequency. According to another embodiment of the present invention, a system for maintaining a relative humidity level in a cabinet includes means for determining a relative humidity set point; means for activating a heater in a fluid pan; means for determining if a fluid is present in the fluid pan; means for measuring the relative humidity in said cabinet; and means for maintaining the relative humidity within a predetermined range.

Other objects, features, and advantages will be understood by persons skilled in the art from the following detailed description of preferred embodiments of the present invention, in view of the accompanying figures.

BRIEF DESCRIPTION OF THE DRAWINGS

Embodiments of the invention are described below with reference to the accompanying figures, which are provided by way of example only, and are not intended to limit the present invention.

FIG. 13 is a depiction of the period of the slide vent according to an embodiment of the present invention.

DETAILED DESCRIPTION OF PREFERRED EMBODIMENTS

Figure 1:
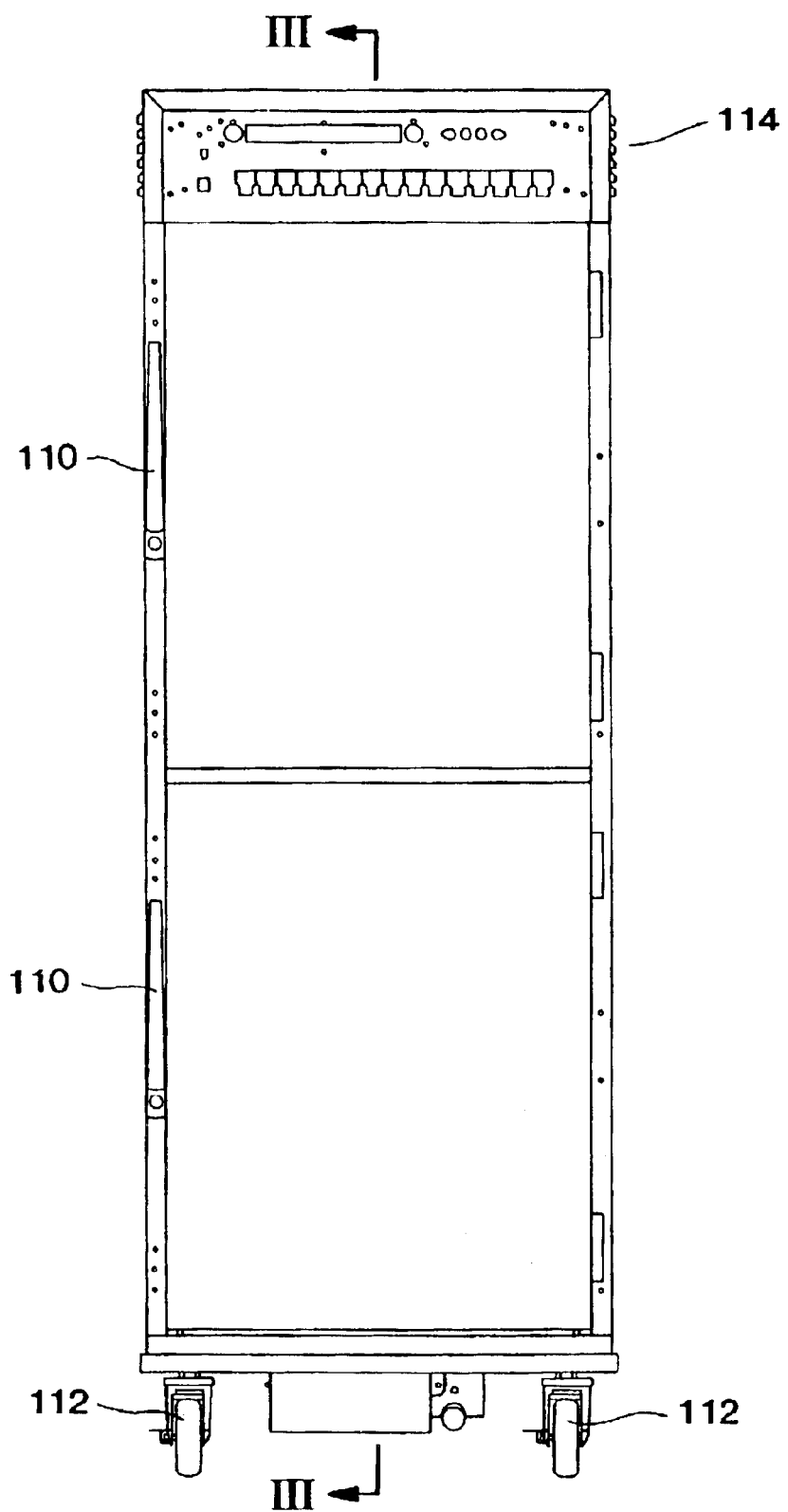
FIG. 1 depicts a front view of the holding cabinet according to an embodiment of the present invention.

Embodiments of the present invention and their technical advantages may be better understood by referring to FIGS. 1 though 13, like numerals referring to like and corresponding parts of the various drawings.

Figure 2:
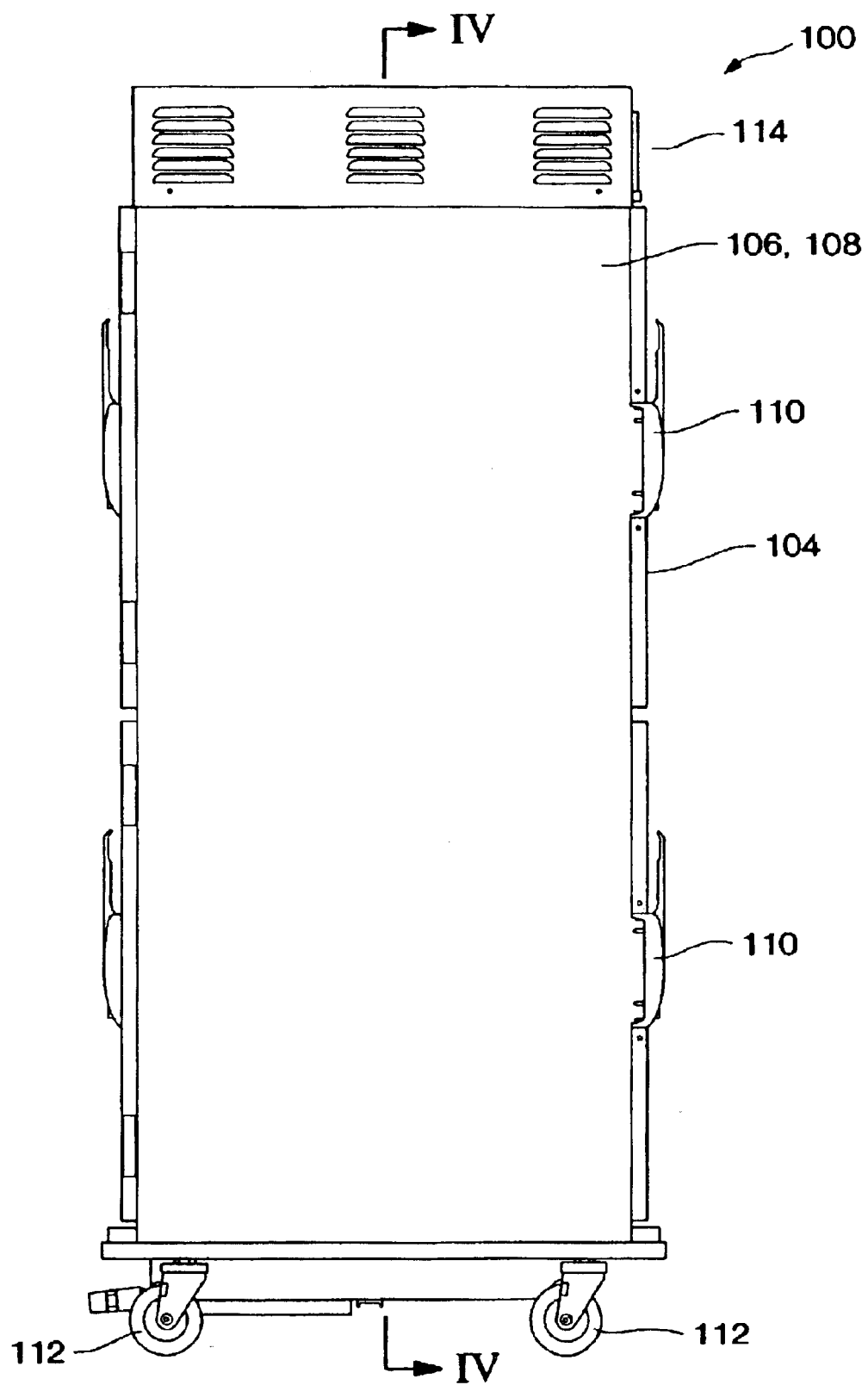
FIG. 2 depicts a side view of the holding cabinet according to an embodiment of the present invention.

Referring to FIGS. 1 and 2, a front view of the holding cabinet and a side view of the holding cabinet according to an embodiment of the present invention are provided. Holding cabinet 100 has a front 102, back 104, and sides 106 and 108. Front 102 and back 104 may both have at least one door with a corresponding locking mechanism 110. In the embodiment depicted in FIGS. 1 and 2, front 102 and back 104 each have two doors.

Module 114 is provided to house equipment used to control the relative humidity in cabinet 100. In an embodiment, holding cabinet 100 may be provided with a plurality of wheels 112.

Figure 3:
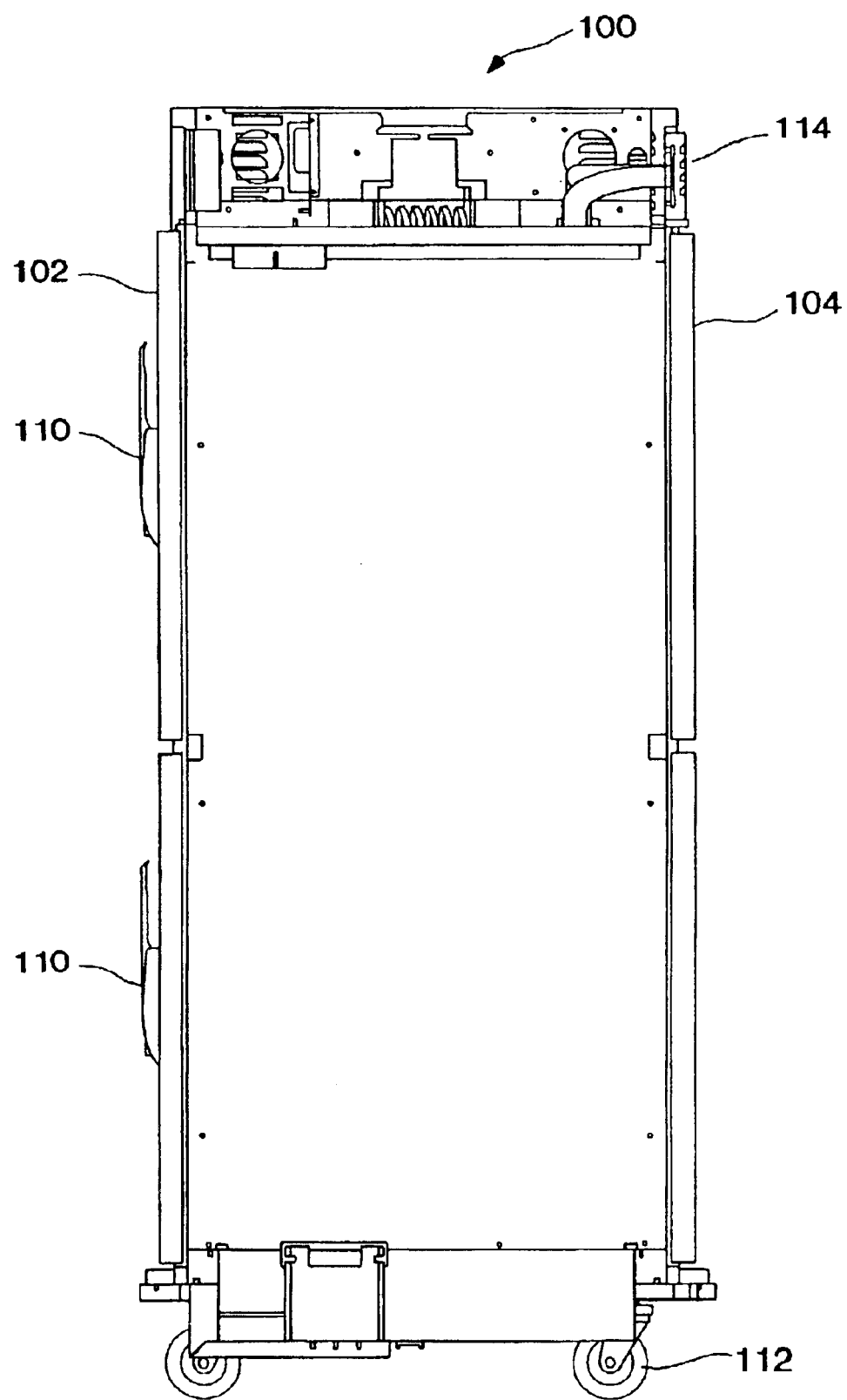
FIG. 3 depicts a cross-sectional view of the holding cabinet of the present invention, along line III—III of FIG. 1.
Figure 4:
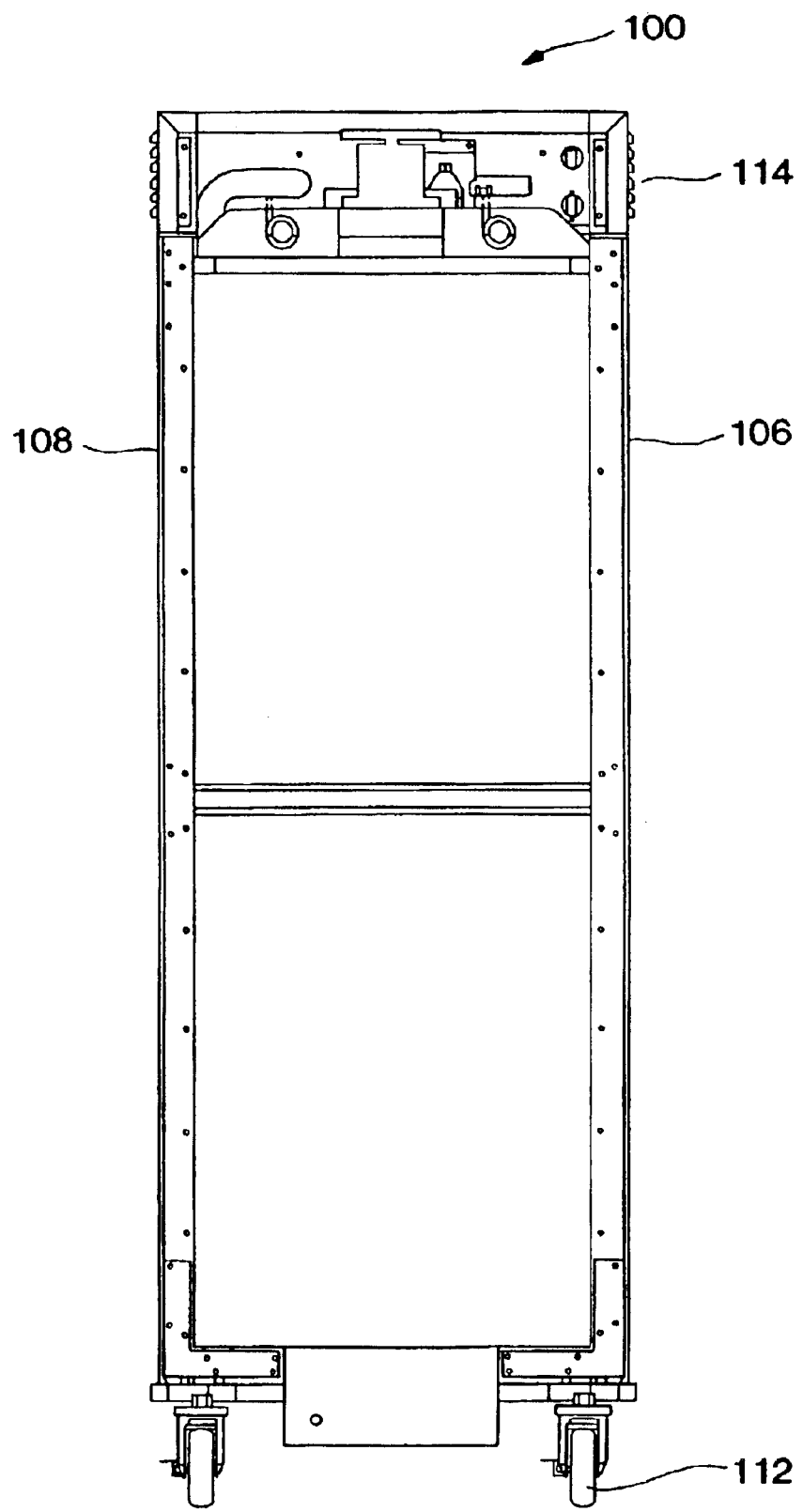
FIG. 4 depicts a cross-sectional view of the holding cabinet of the present invention, along line IV—IV of FIG. 2.
Figure 5:
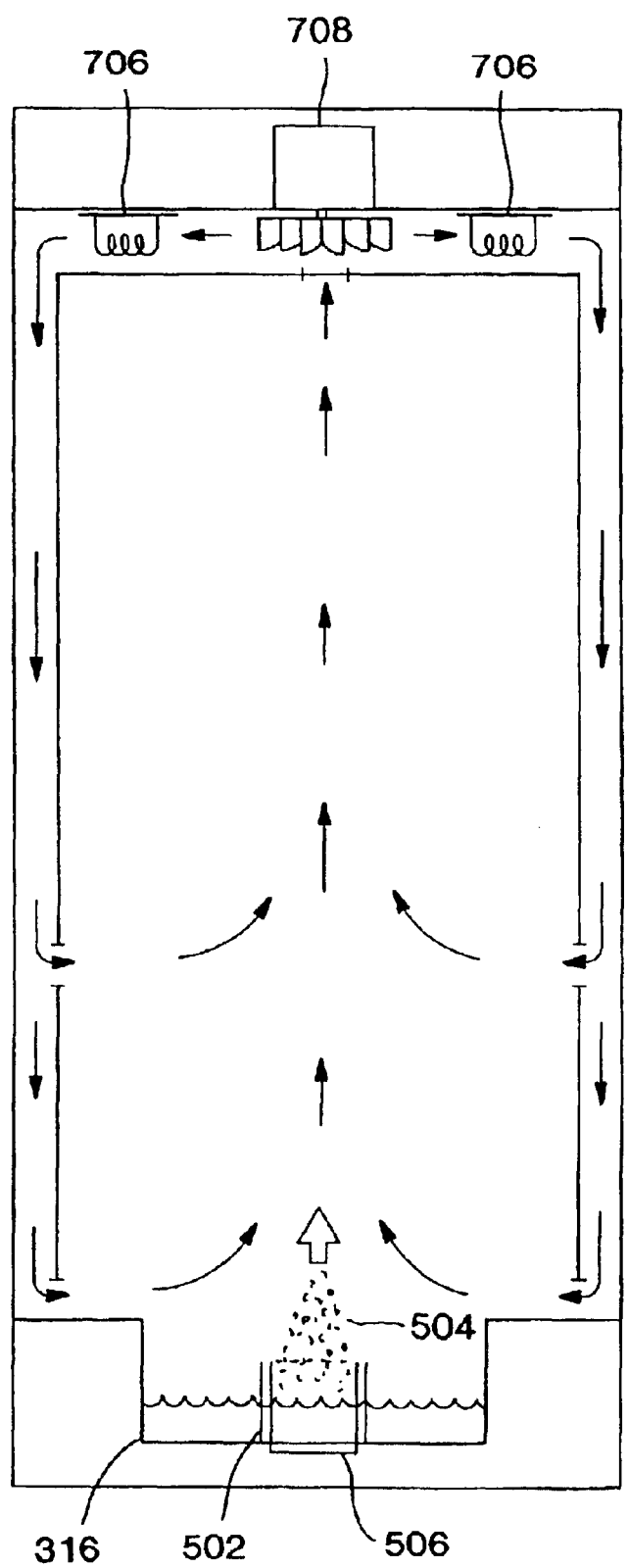
FIG. 5 is a schematic depiction of the air and humid air circulation within the holding cabinet according to an embodiment of the present invention.

Referring to FIG. 3, a cross-sectional view of the holding cabinet of the present invention, along line III—III of FIG. 1 is provided. Referring to FIG. 4, a cross-sectional view of the holding cabinet of the present invention, along line IV—IV of FIG. 2 is provided Referring to FIG. 5, a schematic depiction of the air and humid air circulation within the holding cabinet according to one embodiment of the present invention is provided. Blower motor 708 is provided, as are heaters 706. In the embodiment shown, two heaters 706 are provided; other numbers and locations of heater 706 may also be used.

Figure 6:
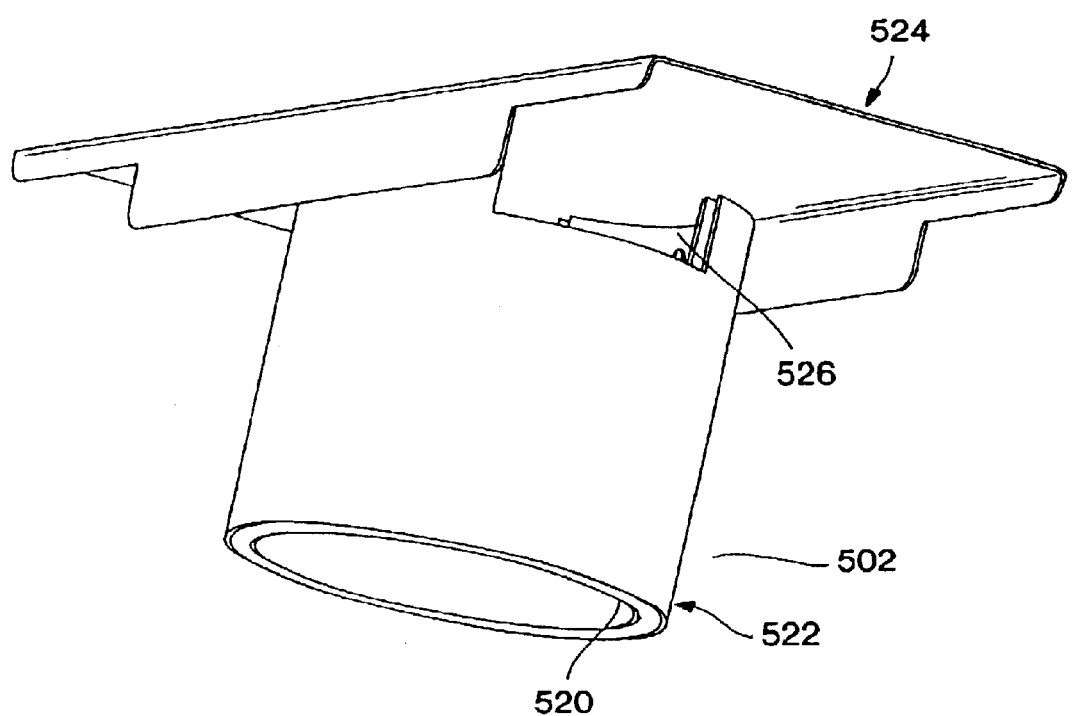
FIG. 6 is a perspective view of a water pan cover and ring assembly according to an embodiment of the present invention.

Water pan 316 is provided with water pan cover and ring assembly 502, which is shown in detail in FIG. 6. Water pan cover and ring assembly 502 includes inner ring 520, outer ring 522, and cover 524. Steam exhaust ports 526 may be provided. In one embodiment, two exhaust ports 526 are provided, at opposite sides of the rings.

Referring again to FIG. 5, water pan in water pan 316 is heated by a water pan heater 506, which causes the water in water pan 316 to vaporize into steam 504. Inner and outer rings 520 and 522 of assembly 502 concentrate heat generated by water pan heater 506, assisting in the vaporization.

Figure 7:
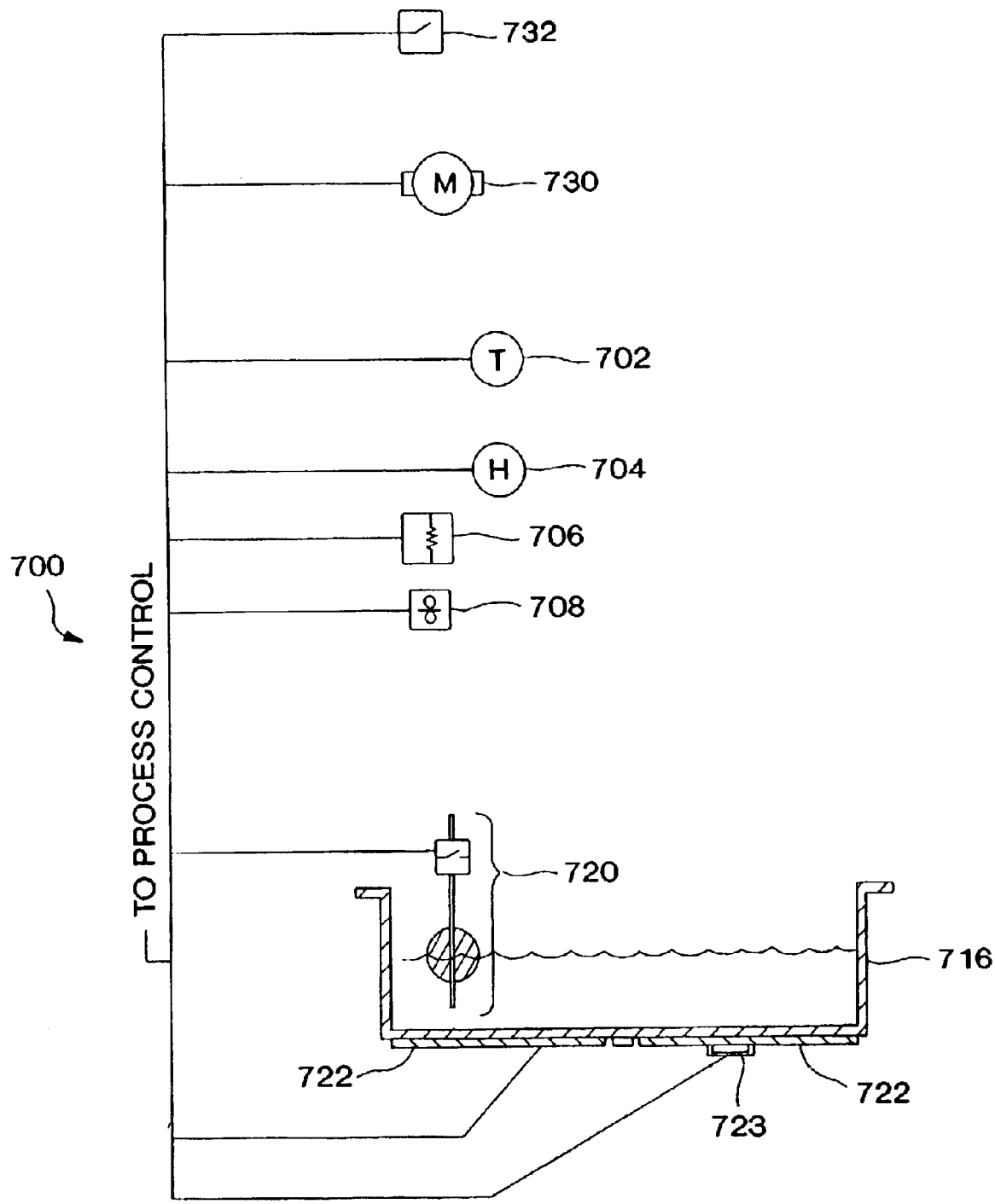
FIG. 7 is a schematic depiction of the humidity generating pan and the control and monitoring interconnections of the holding cabinet according to an embodiment of the present invention.

FIG. 7 depicts a block diagram of system 700 according to an embodiment of the present invention. System 700 includes air temperature probe 702, which measures the temperature of the air in the holding cabinet. Air temperature probe 702 may also be used to provide temperature compensation for humidity sensor 704 In one embodiment, air temperature probe 702 may be part number DC32006A-3-18, manufactured by Durex Industries, Cary, Ill.

Humidity sensor 704 measures the relative humidity of the air in the cabinet (H1). In an embodiment, humidity sensor 704 may be E&E Electronik Part No. EE00-FR3, manufactured by JLC International, Warminster, Pa. Air heater 706 heats the air in the cabinet to the set point specified by the user. In one embodiment, air heater 606 may be part number U3-32-764-34, 500W, 1000 W, or 1500 W, manufactured by Watlow, Hannibal, Mo. Air fan 708 circulates heated air through the cabinet so that the entire cabinet volume is at the same temperature. In one embodiment, air fan 708 may be part number SX-19695 (240V) or SX-20441 (208V), manufactured by Jakel, Highland, Ill.

Water pan 716 holds water to be boiled to create humidity. In one embodiment, water pan heater 722 may be #-8-MSM22866-xxx, manufactured by Minco, Minneapolis, Minn. In another embodiment, heating elements may be screened onto water pan 716. Float switch 720 is provided to determine the water level in water pan 716. In an embodiment, float switch 720 may control water flow into water pan 716 when the water level is below a desired level. An water pan heater (RTD) temperature sensor 723 is affixed to water pan heater 722. Alternatively, sensor 723 may be integral with heater 722. Sensor 723 may measure the temperature of heater 722 and input such measured temperature values to System 700.

Water pan heater temperature sensor 723 is linked to control system 700 to ensure that water pan heater 722 remains off when either of at least two conditions occurs: first, when no water is in water pan 716 or second, when float switch 720 fails. In normal operation, float switch 720 signals control system 700 that water pan 716 is empty, so control system 700 does not activate water pan heater 722. Nevertheless, line build-up, debris, or abuse may cause float switch 720 to fail in the "full water pan" position. Water pan 716 and water pan heater 722 may be quickly damaged if water pan heater 722 is activated while water pan 716 is empty. Water pan heater temperature sensor 723 performs as a backup to float switch 720 to reduce or eliminate the risk of such damage to water pan 716 or water pan heater 722, or both.

Slide vent motor 730 controls the movement of the slide vent, which, in turn opens and closes the cabinet vent. Slide vent position switch 732 is provided to provide an indication of the status of the vent. In one embodiment, side vent position switch 732 may be part number KWABQACC, manufactured by Cherry Electrical Products, Pleasant Prairie, Wis. Switch 732 may also be an switch, optical proximity switch.

Process inputs and outputs connect to the process control as shown. Temperature sensor 798 is built into heater 722 and measures the water pan temperature.

The cabinet air temperature is regulated with air temp sensor 702, air heater 706 and air fan 708. The air temp regulation is obvious to those skilled in the art, and consists simply of regulating the air temperature to the programmed set point. This may be a simple thermostatic (on/off) control with hysteresis, or may be a more sophisticated PID (proportional/integral/derivative) control algorithm.

Humidity may be regulated by 1) adding humidity when the cabinet humidity is below the humidity set point, and 2) decreasing humidity by introducing outside ambient air to the cabinet, when the cabinet humidity is above the programmed set point. Thus, there are two separate systems to regulate the humidity: a humidity generation system, and a "venting" system.

Figure 8:
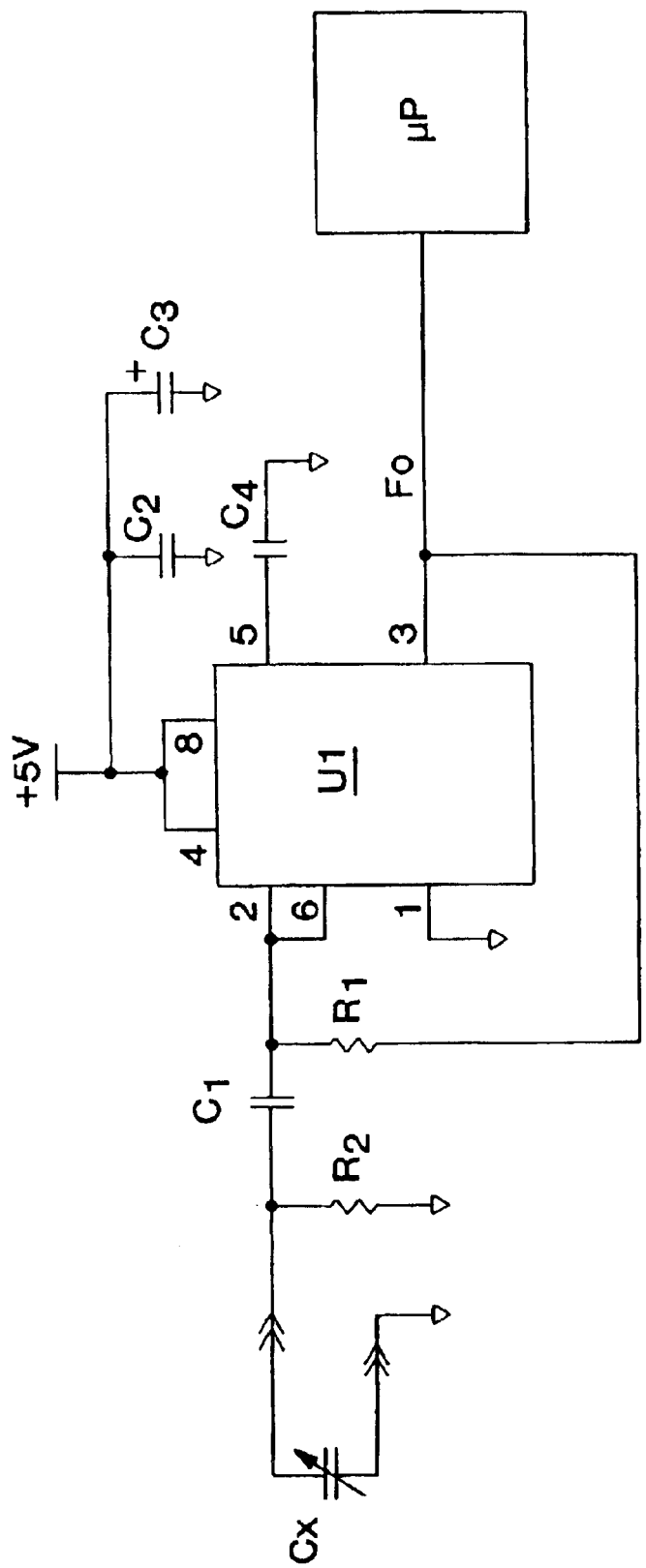
FIG. 8 depicts the circuitry of the humidity detection transducer according to an embodiment of the present invention.

Referring to FIG. 8, humidity transducer circuit 800 according to one embodiment of the present invention is provided. Timer U1 forms an astable oscillator with output frequency, $F_O$, set by capacitors $C_x$, $C_1$, and resistor $R_1$. Capacitors $C_2$ and $C_3$ bypass power supply. Capacitor $C_1$ blocks DC voltage to transducer $C_x$, which is damaged by DC voltage. Resistor $R_1$ sets the frequency, $F_O$. Resistor $R_2$ drains charge from capacitor $C_1$ during power-down. Transducer $C_x$ capacitance varies with humidity. Microprocessor $\mu P$ measures $F_O$ period by counting pulses ($n_2$) for $\frac{1}{16}$ second.

Example values for the elements in FIG. 8 are provided below:

| Element | Value |
|---------|-------|
| U1 | LMC 555 C Timer |
| $R_1$ | 24.9 K |
| $R_2$ | 5 M |
| $C_1$ | .039 $\mu F$, 50 V, 1%, 100 PAM |
| $C_2$ | 0.1 $\mu F$ ceramic disk |
| $C_3$ | 10 $\mu F$ Tantalum |
| $C_X$ | Humidity Transducer, E & E Electronik EE00-F123 |

The relative humidity percentage (% RH) may be determined by the following equation:

$$\% RH = 419.734 \left( \frac{4343.287}{n_2 + 360} - 1 \right)$$

Capacitance $C_X$ also is affected by temperature, therefore, % RH is compensated for temperature with this equation:

$$\% RH_C = [(T_F - 140)(0.0016667) + 1](\% RH)$$

where:

$T_F$ is air temperature in ° F. % $RH_C$ is used to display and regulate humidity.

The systems of the present invention may implement a proofing mode of operation. As noted above, this invention may combine the proofing and holding functions in a single cabinet. For example, on initiation of any power-up condition, a user interface, e.g., a display, for the control system may offer the user the opportunity to initiate a "Proof" option. The user may have a limited time window, e.g., ten (10) seconds, within which to accept this option. The user may accept the option by activating a particular switch, e.g., a TEMP switch, or a combination of switches. If the option is not accepted during the time window, the control system initiates the hold (higher temperature) mode. However, if the option is accepted, the control system initiates the proof (lower temperature) mode.

The hold and proof modes are distinguished by the maximum allowable air temperature set point. For example, in the proof mode, the maximum allowable air temperature set point may be the minimum hold temperature. Thus, if the minimum hold temperature were 150° F., the maximum proof temperature setpoint would be 150° F. Similarly, if the minimum hold temperature were 150° F., the maximum allowable hold mode air temperature set point might be 220° F., and the hold mode temperature range might be 150° F. to 220° F.

Figure 9A:
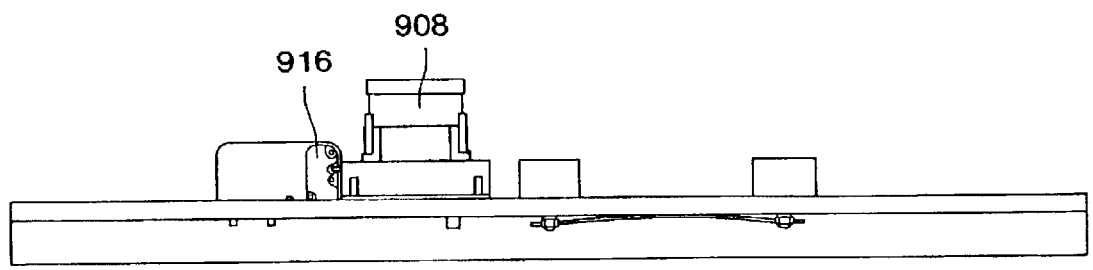
FIGS. 9A and 9B are side and top views of a slide vent according to an embodiment of the present invention.
Figure 9B:
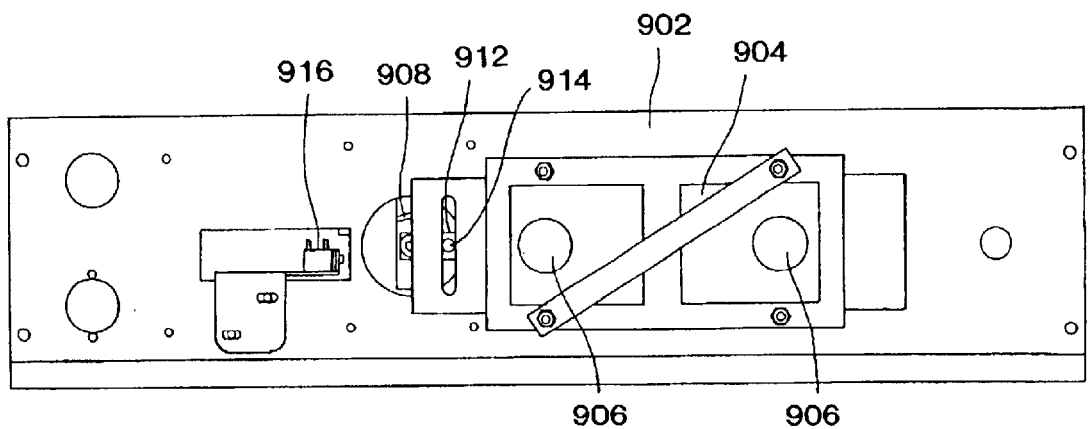

Referring to FIGS. 9A and 9B, side and top views of a slide vent according to an embodiment of the present invention are provided. In general, cabinet panel 902 is provided with slide panel 904. Both cabinet panel 902 and slide panel 904 have at least one opening 906. In one embodiment, openings 906 in cabinet panel 902 are fixed, while openings 902 in slide panel 904 slide relative to openings 906 in cabinet panel 902. Gear motor 908 drives slide panel 904 linearly to open or close openings 906 via lever arm 912 and slide pin 914. In one embodiment, motor 908 is model number EB-5206, manufactured by Custom Products, Inc., New Haven, Conn., or part number AB, manufactured by Hurst Manufacturing Corporation, Princeton, Ind.

As slide panel 904 slides relative to cabinet panel 902, openings 906 on slide panel 904 line up with openings 906 on cabinet panel 902, in effect opening a passage to the blower inlet and outlet (not shown). When slide panel 904 slides its full distance, openings 906 in cabinet panel 902 are fully uncovered. At this point, slide panel 904 begins sliding in the opposite direction, and openings 906 in cabinet panel 902 are covered, blocking access to the blower inlet and outlet (not shown).

Switch 916 is provided to indicate when vents 906 are fully closed. In another embodiment, switch 916 may be provided to indicate when vents 906 are fully opened. This variance may depend on the position of switch 916 with respect to slide 904. Other arrangements may be provided as desired. Switch 916 may be used during calibration to determine the period of slide vent 904. This is discussed in greater detail, below.

Figure 10A:
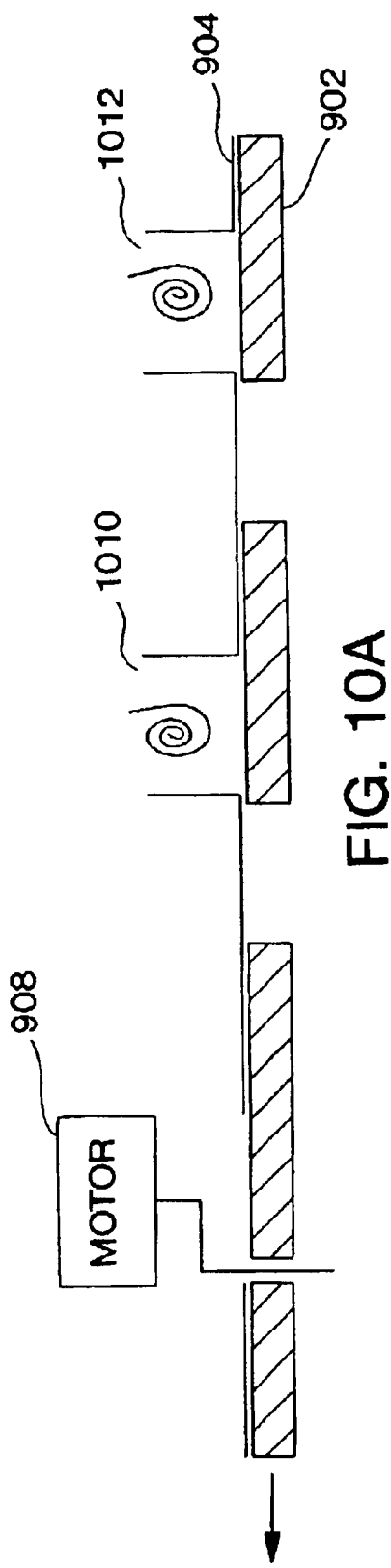
FIGS. 10A and 10B are schematic depictions of the slide vent and cabinet openings according to an embodiment of the present invention.
Figure 10B:
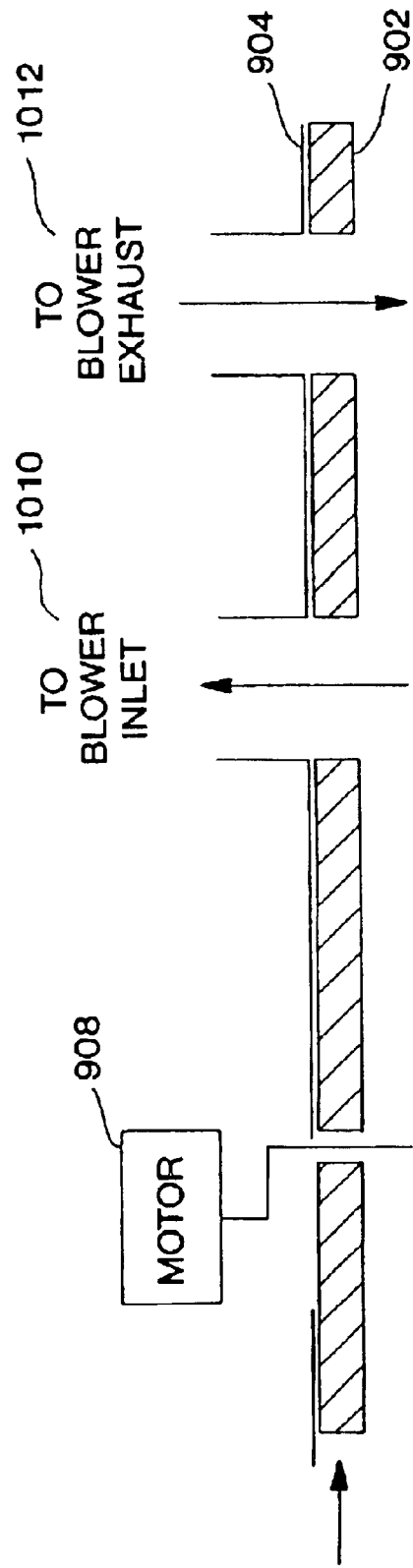

Referring to FIGS. 10A and 10B, depictions of the slide vent in its closed and open positions are provided, respectively. In FIG. 10A, slide vent 904 is positioned such that air does not flow from the exterior of the cabinet into blower inlet 1010, and out of blower exhaust 1012. When motor 908 is activated, however, slide vent 904 is moved, shown in FIG. 10B, opens blower inlet 1010 and blower exhaust 1012.

Figure 11:
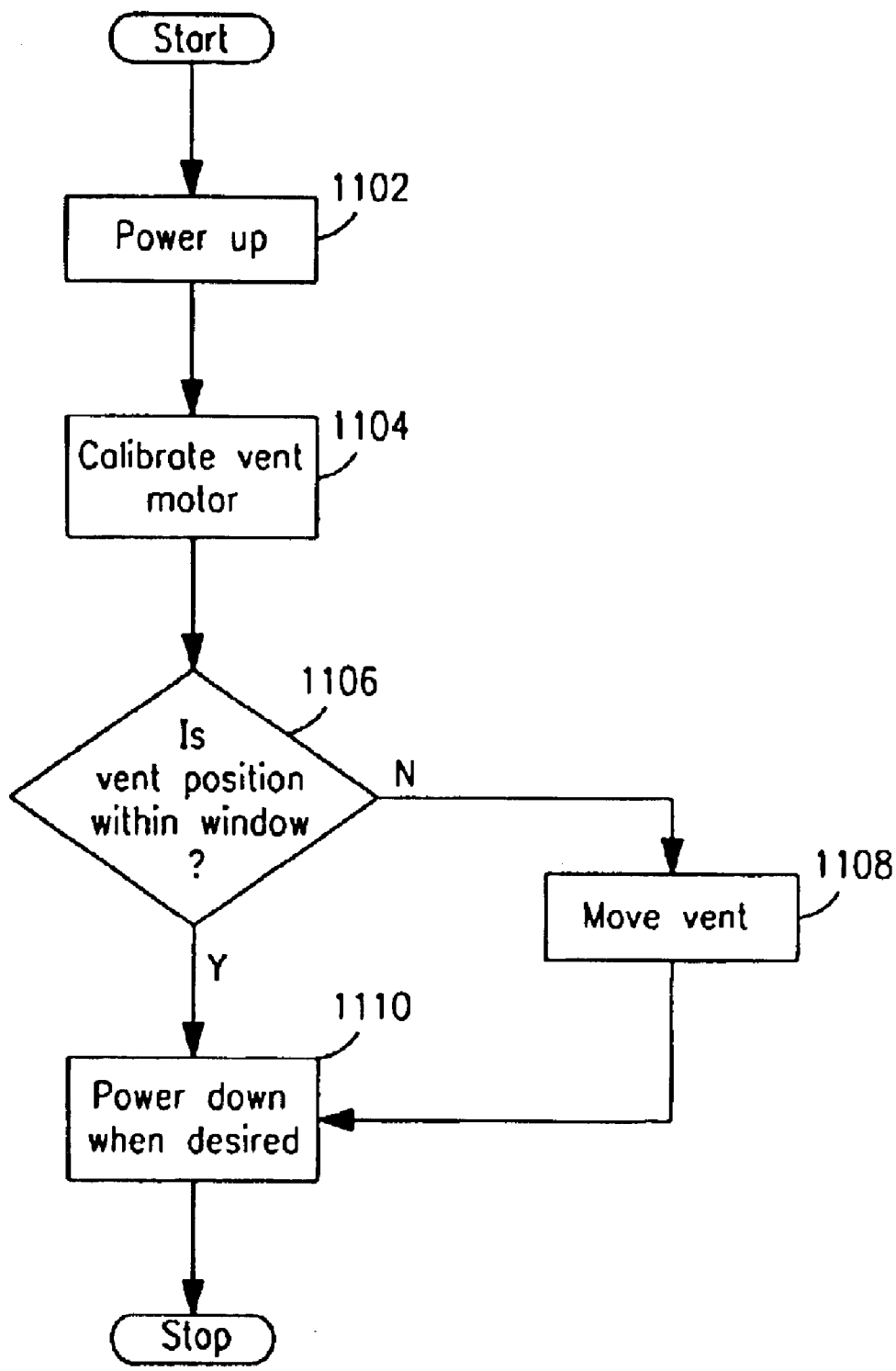
FIG. 11 is a flowchart of the process for vent operation according to an embodiment of the present invention.

Referring to FIG. 11, a flowchart of the general operation of the cabinet is provided. In step 1102, the cabinet is powered up. This may involved initializing cabinet components, which is known to one of ordinary skill in the art.

In step 1104, the vent motor is calibrated. This process is described in greater detail in FIGS. 12 and 13, below.

Figure 12:
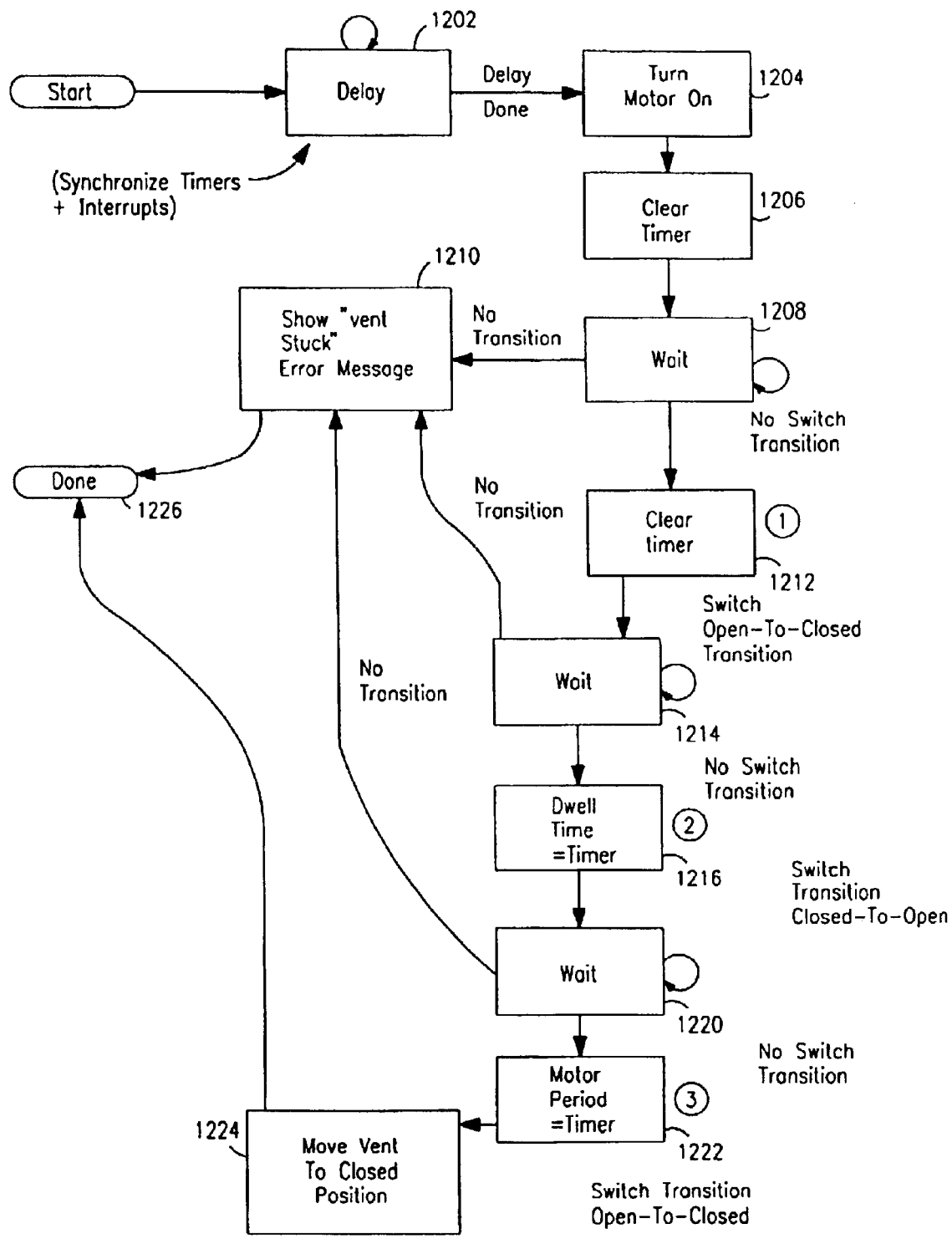
FIG. 12 is a flowchart of the calibration process for the slide vent motor according to an embodiment of the present invention.

Referring to FIG. 12, a flowchart of the slide vent motor calibration process according to one embodiment of the present invention is provided. The purpose of the calibration is to account for variations in the actual time required to move the vent from one position to another. Even though a synchronous AC motor may be used, the time for one revolution may vary because 1) the line frequency may be 50 Hz or 60 Hz, and 2) friction and debris in the mechanism may slow the vent movement.

In general, the control software needs to know the time for one complete revolution to be able to move the vent from the fully-opened to the fully-closed position. The control knows when the vent is fully-closed, because a vent switch actuates at that position. Thus, if the actual period for the vent movement is $T_{VENT}$, then the vent is fully open at time $T_{VENT}/2$. Also, the control may move the vent to other positions, such as 50% open area, by actuating the motor for some time that is a fraction of $T_{VENT}$. For example, to open the vent to about 50% open area, the control activates the motor for about $T_{VENT}/4$, from either the fully-open or fully-closed position.

In one embodiment, although the vent open area is not a linear function of the vent motor actuation time, it provides a suitable approximation, permitting the vent motor actuation time to be used to position the slide vent. In another embodiment, different shapes for the vent holes may be used to provide a linear relationship between motor actuation time and vent open area.

FIG. 13 depicts the vent operation as far at the control is concerned. As the motor turns and the vent actuates the vent switch, the vent switch is really actuated for some period of time, which may be referred to as the "dwell time," or $T_{DWELL}$. The control may account for $T_{DWELL}$ when calculating the time needed to actuate the motor to achieve a given vent position.

Referring again to FIG. 12, in one embodiment, the vent calibration routine uses a timer that is always running, so there is no need to start or stop the timer, just a need to reset it to find the dwell time and the period. In step 1202, there is a predetermined delay, during which timers and interrupts are synchronized. In one embodiment, this may be a one second delay; other delays may be used, as required. In another embodiment, this delay may be omitted.

In step 1204, after the timers and interrupts are synchronized, the vent motor is activated, causing the slide vent to move. The timer is cleared in step 1206, and, in step 1208, the control waits for a first transition signal from vent switch. This signal indicates that the vent switch is being activated. If there is no switch signal within a predetermined time, an error message is presented to the user in step 1210. This may be by a visual or audible signal, such as a CRT, a LED, a bell, a chime, and the like. In an embodiment, a suitable message, such as "Vent Stuck" is displayed for the user.

In one embodiment, the predetermined amount of time may be 48 seconds. Other suitable lengths of time may be used as desired. This time may be selected based on, inter alia, the known general period of the vent. The time may also be selected to prevent damage to the motor. After the predetermined time is elapsed, the motor may be shut off.

If a signal is received from the vent switch, in step 1208, the timer is cleared, and in step 1214, the control waits for a second transition signal from the vent switch, indicating that the vent switch is no longer actuated. Similar to above, if a predetermined time passes without a signal from the vent switch, the user may be notified in step 1210. Once the second transition signal is received, in step 1216, the timer is read, indicating the dwell time, or $T_{DWELL}$. In step 1220, similar to steps 1208 and 1214, the control waits for a transition signal from the vent switch. Once a transition signal is received, indicating that the vent has completed its cycle, in step 1222, the timer is read. This is $T_{VENT}$.

In step 1224, the vent is moved to the fully-closed position. As discussed above, this may be achieved by activating the motor for $T_{VENT}/2$.

The control may use the time required to move the vent to detect faults in the vent system. If it takes longer than a predetermined time for one complete revolution, the control assumes that the vent is stuck, or the motor has failed, and displays a fault message.

Referring again to FIG. 11, in step 1106, the control determines if the vent position is within a predetermined tolerance of its requested position. In an embodiment, the vent position may be expressed as an opening percentage—from 100% open, to 0% open. In this step, it is determined if the actual position is within a predetermined window of the desired position. This may be about 10%, 5%, 2%, and the like. In one embodiment, it is about 1%. If the vent is within this window, no adjustments are made.

If, in step 1108, it is determined that the vent is not within the predetermined window, the vent motor is activated for a determined amount of time to move the vent to its desired position.

In step 1110, the device may be powered down. When this occurs, it is possible that humidity may condense on the humidity sensor as the air temperature within the cabinet drops. This may 1) damage the humidity sensor, or 2) cause false humidity readings during operation. In order to compensate for this problem, in one embodiment, the device enters "purge" mode that is activated when the control switch is changed from "operate" to "standby" or "off." In this mode, the air heater and the water heater are turned off, and the fan is activated if the humidity is greater than a predetermined level. The predetermined humidity level may be selected as a compromise between low humidity (much lower than 100%) and high ambient humidity that exists within restaurants or other operating environments. In one embodiment, this percentage may be 80%.

When the fan is activated, air from outside the cabinet is injected into the cabinet, for the most part, preventing the humidity in the cabinet from exceeding the predetermined level. In general, controlling the humidity in the cabinet involves regulating the water heat output and the vent motor output. The water heat output is usually turned on to increase humidity within the cabinet, while the vent is usually opened to reduce humidity within the cabinet.

Figure 14A:
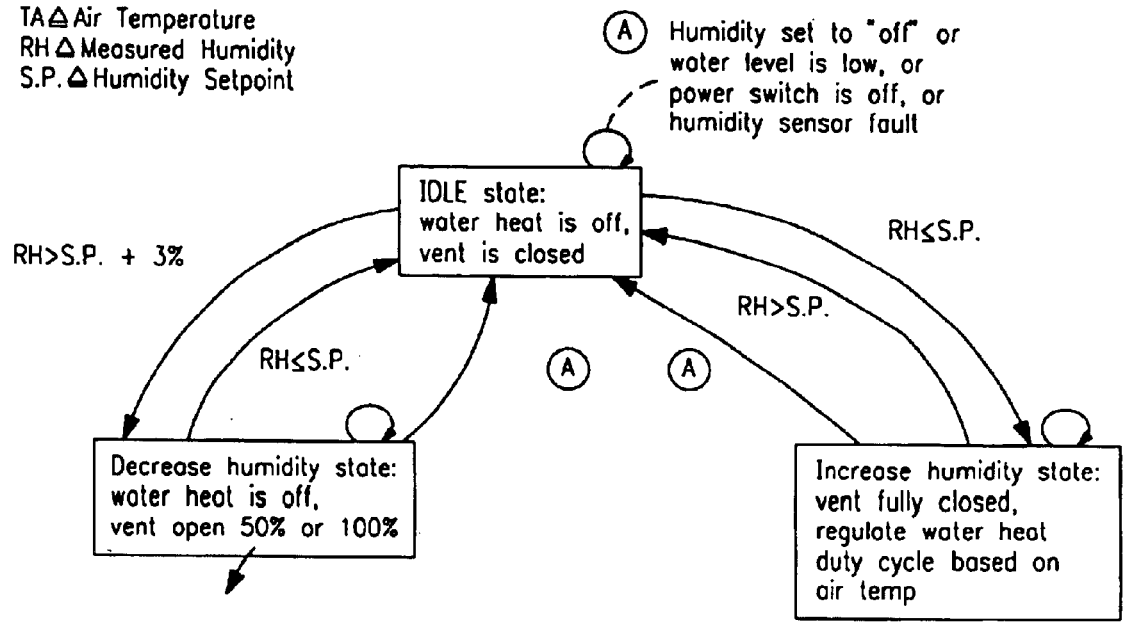
FIG. 14A depicts a humidity regulation state diagram according to an embodiment of the present invention.
Figure 14B:
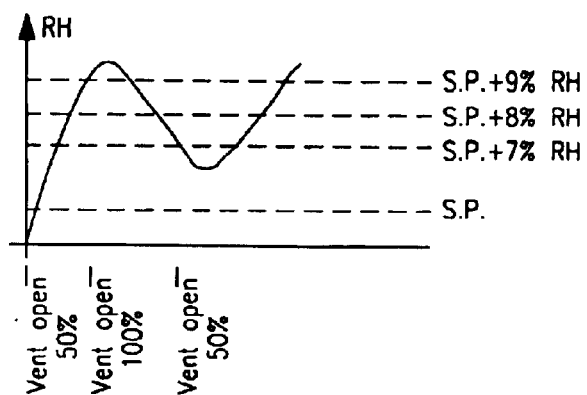
FIG. 14B is a graphical representation of the humidity control process according to an embodiment of the present invention.

According to an embodiment of the present invention, the humidity control method consists of three states: Idle, Increase Humidity, and Decrease Humidity. Referring to FIG. 14A, a humidity regulation state diagram is provided. In the decrease humidity state, the vent is either open 50% or 100%, depending on how far the actual humidity is above the set point. Other opening percentages may be used as desired. FIG. 14B provides a graphical representation of the humidity regulation.

In addition, the control levels of SP+9% RH and SP+7% just amount to a hysteresis band that switches between about 50% and about 100% vent opening.

Figure 15A:
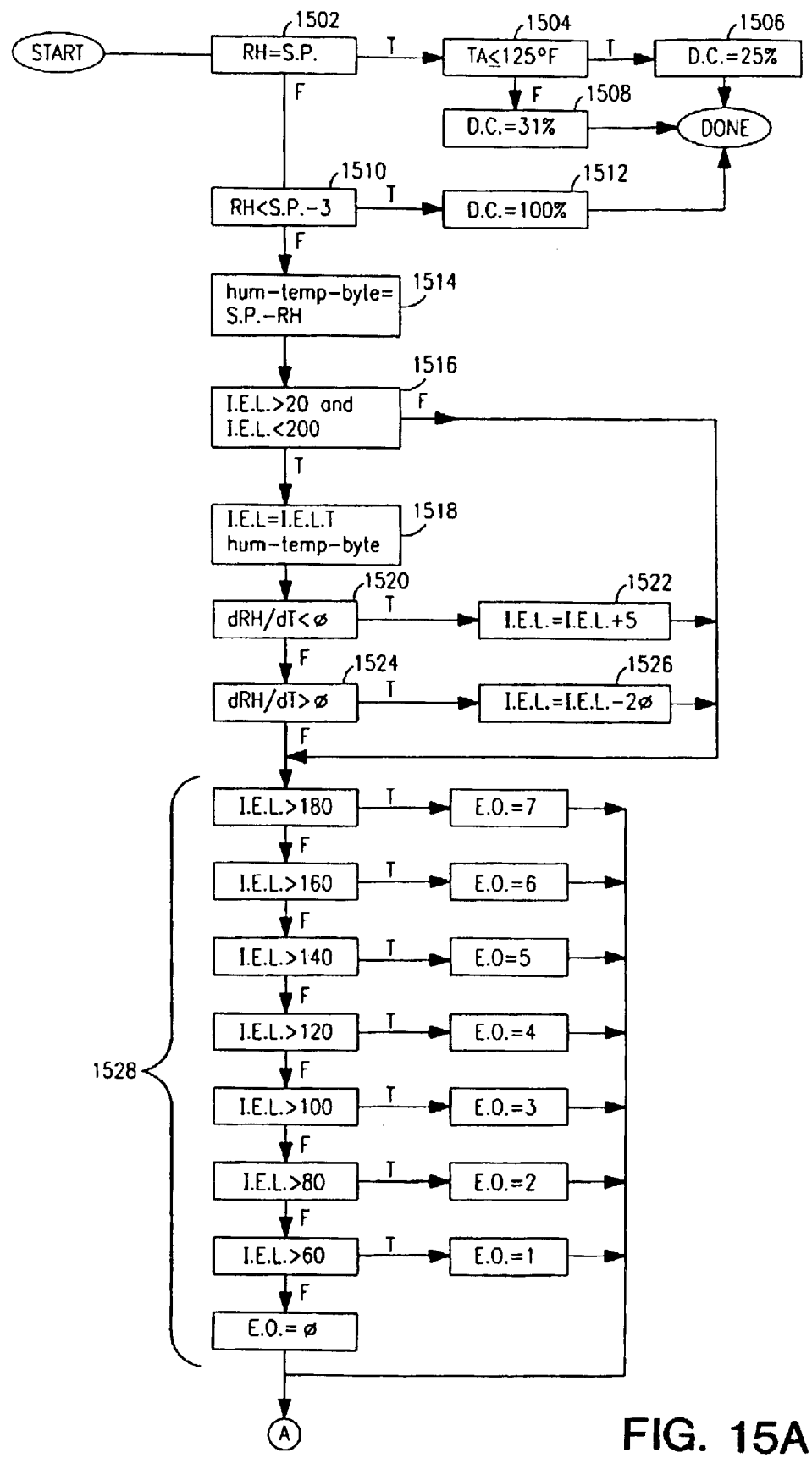
FIGS. 15A and 15B show is a flowchart of the process for increasing humidity according to an embodiment of the present invention.
Figure 15B:
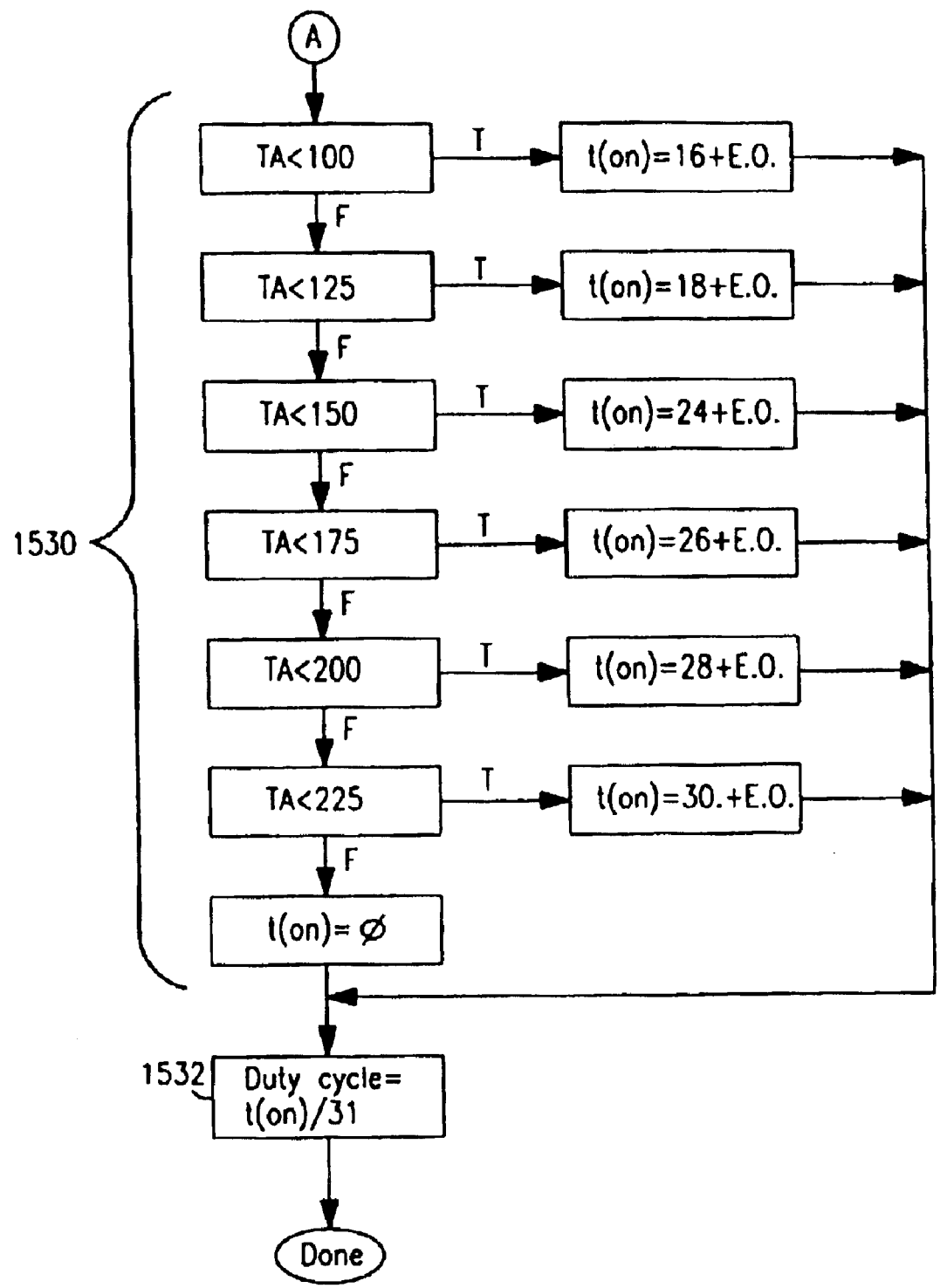

In the Increase Humidity state, the net result of the flow chart logic is to determine a duty cycle setting for the water heat output. The duty cycle is the number of $\frac{1}{16}$ second intervals, out of a period of 2 seconds that the water heat is on. For example, in a duty cycle of 25%, the heat is on for 0.5 seconds, which is 8 intervals of $\frac{1}{16}$ second. Referring to FIGS. 15A and 15B a flowchart depicting the Increase Humidity logic according to one embodiment of the present invention is provided.

The humidity control is similar to PID control, but the derivative information is only used to update the integral term.

Blocks 1502 to 1508 set the water heat duty cycle when the actual humidity is the same as the set point. If the temperature is below 125° F., the duty cycle is set to 25%. If the temperature is above 125° F., the duty cycle is set to 31%. These cycles act to maintain the humidity near the set point. A higher duty cycle is needed at higher temperatures. Blocks 1510 and 1512 set the duty cycle to 100% (full on) if the actual humidity is more than 3% RH below the humidity set point. This acts to bring the humidity back to the set point. Block 1514 calculates the humidity error (humidity set point-actual humidity) and saves it in a variable called hum_temp_byte.

Blocks 1516–1526 adjust the integral correction term I.E.L. (which stands for the code variable integral_error_level). The test in block 1516 limits I.E.L. to values of 20 and 200. Block 1518 adds the humidity error to I.E.L. Blocks 1520 to 1526 add 5 to I.E.L. if the humidity is decreasing, and subtract 20 from I.E.L. if the humidity is increasing.

The initialization of I.E.L. is not shown, but I.E.L. is set to zero whenever the Increase Humidity state is entered, or whenever the measured humidity equals the set point.

The blocks in 1528 set a new variable, E.O. (for error_offset) from the value of I.E.L. just found. Note that a larger value of I.E.L. results in a larger value of E.O.

The blocks in 1530 find the duty-cycle on-time, called t(on). t(on) is a function of E.O. and the air temperature Ta. t(on) is just the sum of a constant that depends on the air temperature and the value of E.O.

Finally, block 1532 show that the actual duty cycle is calculated from t(on)/31. The divisor is "31" because a 16 Hz clock is used for the water heat output. The duty-cycle period is 2 seconds, but the clock actually counts from 0 to 31.

Figure 16:
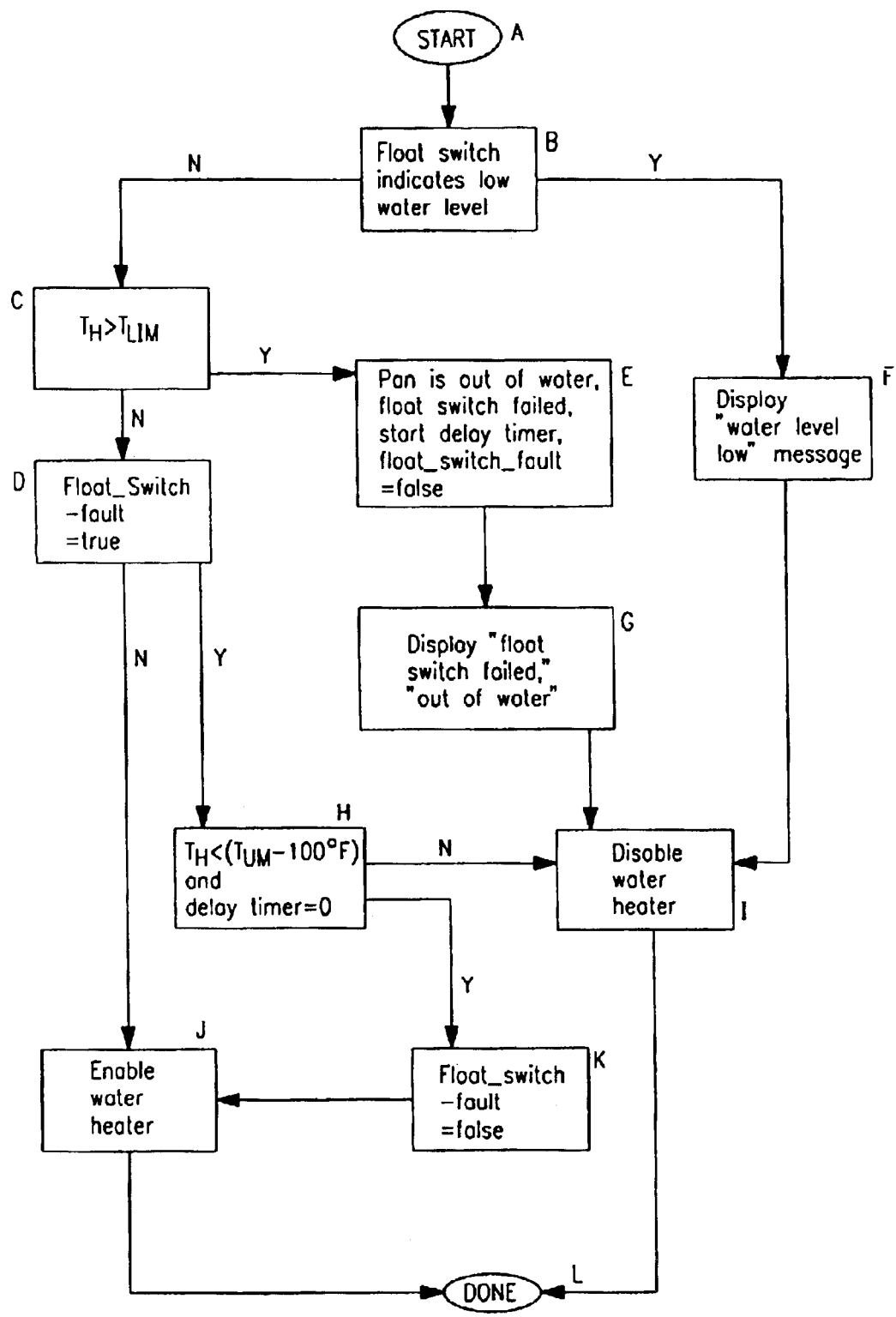
FIG. 16 is a flowchart depicting the operation of the closed-loop humidity control system.

Referring to FIG. 16, a flow chart of the operation of a closed-loop humidity control system is depicted. In this chart, $T_H$ is the water pan heater temperature measured by water pan heater temperature sensor 723, and $T_{UM}$ is the maximum allowable water pan temperature. A Float-Switch-Fault is true when float switch 720 has failed. Float switch 720 has failed when it fails to accurately detect significant changes in the water level in water pan 716.

Various operational conditions are detailed with respect to FIG. 16. If water pan 716 is found empty during normal operations, float switch 720 will indicate allow water level (Step B) and a "low water level" message is displayed (Step F). Water pan heater 722 then will be disabled (Step I), and control system 700 will complete its operation (Step L).

Similarly, if water pan 716 is incorrectly found empty during normal operations, float switch 720 again will indicate a low water level (Step B). However, control system 700 will inquire whether $T_H > T_{LIM}$ (Step C). If $T_H$ $T_{LIM}$, the Float-Switch-Fault is true (Step D), and water pan heater 722 is enabled (Step J). Control system 700 then again completes its operation (Step L).

If a Float-Switch-Fault is detected, a low water level is again detected (Step B) and control system 700 again will inquire whether $T_H > T_{LIM}$ (Step C). If $T_H > T_{LIM}$, then water pan 716 is empty or low on water and Float-Switch-Fault is true (Step E). The display may then indicate "Float Switch Failed" and "Out of Water" or "Pan Empty" (Step G). Water pan heater 722 will be disabled (Step I), and control system 700 will complete its operation (Step L).

While waiting for a Float-Switch-Fault to clear, Float switch 720 will initially indicate that the water level in water pan 716 is low (Step B). Control system 700 then will inquire whether $T_H > T_{LIM}$ (Step C). If $T_H$ $T_{LIM}$ then Float-Switch-Fault is true (Step D), and if whether $T_H > (T_{LIM} - 100°$ F.) or the reset delay timer is not set to zero (Step H), water pan heater 722 is disabled (Step I). Control system 7800 then will complete its operation (Step L).

Once the Float-Switch-Fault has cleared, if Float switch 720 indicates that the water level in water pan 716 is low (Step B), control system 700 inquires whether $T_H > T_{LIM}$ (Step C). If $T_H$ $T_{LIM}$, then Float-Switch-Fault is true (Step D), and control system 700 inquires whether $T_H > (T_{LIM} - 100°$ F.) and whether the reset delay timer is set to zero.

(Step H). If both these conditions exist, the Float-Switch-Fault is false (Step K), and water pan heater 722 is enabled (Step J). Control system 700 then will complete its operation (Step L).

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

We claim:

1. A method for maintaining a relative humidity level in a cabinet, comprising:

determining a relative humidity set point;

activating a heater in a fluid pan;

determining if a fluid is present in said fluid pan;

measuring said relative humidity and an air temperature in said cabinet; and adjusting a duty cycle of said heater in response to said air temperature to maintain said relative humidity within a predetermined range.

2. The method of claim 1, wherein said step of determining a relative humidity set point comprises:

inputting said relative humidity set point.

3. The method of claim 1, wherein said step of determining if a fluid is present in said fluid pan comprises:

measuring a status of a float switch.

4. The method of claim 1, wherein said step of maintaining said relative humidity within a predetermined range comprises:

repeatedly measuring said relative humidity in said cabinet, and deactivating said heater responsive to said relative humidity within a predetermined range of said relative humidity set point; and reactivating said heater responsive to said relative humidity falling outside of said predetermined range of said relative humidity set point.

5. The method of claim 1, wherein said duty cycle is set at 25% when said air temperature is less than 125° F.

6. The method of claim 1, wherein said duty cycle is set at 31% when said air temperature is greater than 125° F.

7. The method of claim 3, wherein the step of measuring a status of a float switch further comprises measuring a temperature of fluid in said fluid pan and comparing said fluid temperature to a maximum allowable fluid temperature.

8. A system for maintaining a relative humidity level in a cabinet, comprising:

means for determining a relative humidity set point;

means for activating a heater in a fluid pan;

means for determining if a fluid is present in said fluid pan;

means for measuring said relative humidity and an air temperature in said cabinet; and means for adjusting a duty cycle of said heater in response to said air temperature to maintain said relative humidity within a predetermined range.

9. The system of claim 8, wherein said duty cycle is set at 25% when said air temperature is less than 125° F.

10. The system of claim 8, wherein said duty cycle is set at 31% when said air temperature is greater than 125° F.

11. A method for maintaining a relative humidity level in a cabinet, comprising:

determining a relative humidity set point;

activating a heater in a fluid pan;

determining if a fluid is present in said fluid pan;

measuring said relative humidity in said cabinet; and setting a duty cycle of said heater at 100% if said relative humidity is greater than a predetermined amount below a relative humidity set point to maintaining said relative humidity within a predetermined range.

12. The method of claim 11, wherein said predetermined amount is 3% relative humidity.

13. The method of claim 11, wherein said step of determining if a fluid is present in said fluid pan comprises:

measuring a status of a float switch by measuring a temperature of fluid in said fluid pan and comparing said fluid temperature to a maximum allowable fluid temperature.

14. A system for maintaining a relative humidity level in a cabinet, comprising:

means for determining a relative humidity set point;

means for activating a heater in a fluid pan;

means for determining if a fluid is present in said fluid pan;

means for measuring said relative humidity in said cabinet; and means for setting a duty cycle of said heater at 100% if said relative humidity is greater than a predetermined amount below a relative humidity set point to maintaining said relative humidity within a predetermined range.

15. The system of claim 14, wherein said predetermined amount is 3% relative humidity.

* * * * *